(12) United States Patent
Herbold et al.

(10) Patent No.: US 7,004,526 B2
(45) Date of Patent: Feb. 28, 2006

(54) CARRIER SYSTEM FOR SUPPLEMENTARY INTERIOR EQUIPMENT

(75) Inventors: Gerhard Herbold, Bingen (DE); Claudia Kilburg, Gau-Odernheim (DE); Martin Lindström, Wiesbaden (SE); Michael Polster, Ginsheim (DE); Volker Stein, Wiesbaden (DE)

(73) Assignee: Lear Corporation, Southfield, MI (US)

( * ) Notice: Subject to any disclaimer, the term of this patent is extended or adjusted under 35 U.S.C. 154(b) by 15 days.

(21) Appl. No.: 10/738,613

(22) Filed: Dec. 17, 2003

(65) Prior Publication Data

US 2005/0046216 A1    Mar. 3, 2005

(30) Foreign Application Priority Data

Dec. 21, 2002    (DE) ................................ 102 60 504

(51) Int. Cl.
*B60R 7/04* (2006.01)
(52) U.S. Cl. .............. 296/24.34; 296/37.8; 296/187.05
(58) Field of Classification Search ............ 296/24.34, 296/37.8, 187.05, 193.04, 193.07
See application file for complete search history.

(56) References Cited

U.S. PATENT DOCUMENTS

| | | |
|---|---|---|
| 3,372,896 A | 3/1968 | Myers et al. |
| 5,085,481 A * | 2/1992 | Fluharty et al. ............ 296/37.8 |
| 5,106,143 A * | 4/1992 | Soeters ....................... 296/37.8 |
| 5,112,094 A * | 5/1992 | Kribs ........................ 296/37.8 |
| 6,203,088 B1 * | 3/2001 | Fernandez et al. ......... 296/37.8 |
| 6,497,443 B1 * | 12/2002 | Worrell et al. ............. 296/37.8 |
| 6,736,438 B1 * | 5/2004 | Wieclawski ................ 296/37.8 |

FOREIGN PATENT DOCUMENTS

| | | |
|---|---|---|
| DE | 38 08 748 A1 | 9/1989 |
| DE | 39 36 166 C2 | 3/1994 |
| DE | 198 08 381 A1 | 9/1999 |
| DE | 198 54 240 A1 | 5/2000 |
| DE | 199 01 858 A1 | 7/2000 |
| EP | 0 925 204 B1 | 8/2001 |
| GB | 2 305 856 A | 4/1997 |

* cited by examiner

Primary Examiner—Jason Morrow
(74) Attorney, Agent, or Firm—Brooks Kushman P.C.

(57) ABSTRACT

A carrier system (1) and a method for the mechanical connection of interchangeable supplementary interior equipment, in particular a central console for application in a motor vehicle and for providing an electrical/electronic interface (7) for connection to the on-board electrical supply and/or on-board electronics of the motor vehicle, includes a carrier frame (13), attachment devices (2, 3) with means against unauthorized release, whereby the essentially L-shaped carrier system (1) is arranged suspended in the region between the outer rear seats above the central seat surface and is releasably connected by a rear attachment device (3) and a lower attachment device (12) to the motor vehicle and the supplementary interior equipment by means of the upper attachment device (2) to the carrier system (1).

33 Claims, 10 Drawing Sheets

CARRIER SYSTEM FOR SUPPLEMENTARY INTERIOR EQUIPMENT

BACKGROUND OF THE INVENTION

1. Field of the Invention

The invention relates to a carrier system for the mechanical connection of interchangeable supplementary interior equipment, in particular a central console, for application in a motor vehicle, comprising a carrier frame and attachment devices with means against unauthorised release. Carrier systems are normally used anywhere where supplementary equipment is to be combined with basic equipment.

2. Background Art

In particular carrier systems are used in motor vehicles in which a basic model can additionally be fitted with various items of interior equipment. In this respect differentiation is made between various types of supplementary interior equipment. On one hand, the supplementary interior equipment can be designed for the user such that it can be easily fitted and removed by the user. On the other hand, the interior equipment can only be fitted with the aid of special tools by authorised workshops. The invention is primarily intended for supplementary interior equipment which can be fitted and removed by the operator or user. A typical example of supplementary interior equipment which can be fitted is a child's seat, which can be varied according to the age, weight and/or size of the child. Another example of supplementary interior equipment are central consoles which previously have been permanently installed and can only be interchanged by authorised specialists.

Generally, a generic carrier system is known for joining child's seats to the rear seat bench of a motor vehicle. These are either joined to the motor vehicle by the belt system or by means of other devices.

With the known solution there is the disadvantage that the child's seat is placed on the upholstery of the rear seat bench and consequently causes wear on the seat upholstery. Also, these types of carrier system only offer a mechanical connection and no electrical connection, for example.

Furthermore, central consoles are known which are located in the region of the motor vehicle tunnel. With the known central consoles there is the disadvantage that they can only be fitted by a specialist with special tools.

SUMMARY OF THE INVENTION

It is therefore an object of this invention to provide a carrier system and a method of mechanically connecting interchangeable supplementary interior equipment and to make available an electrical/electronic interface for the connection of an on-board electrical supply and/or on-board electronics of a motor vehicle, with which almost no wear occurs, in particular on the support surface, and which can be easily fitted and removed by the user without special tools, whereby the carrier system is designed for numerous types of supplementary interior equipment.

The invention includes the technical art in that essentially L-shaped carrier systems are arranged suspended in the region between the outer rear seats, whereby the carrier system is at least releasably connected by a rear attachment device and at least by a lower attachment device to the motor vehicle and the supplementary interior equipment is connected by the upper attachment device to the carrier system.

A carrier system within the sense of the invention is generally taken to mean a device for attaching an interchangeable supplementary part with a basic part and particularly an attachment device for attaching interchangeable accessories and supplementary equipment in a motor vehicle. The arrangement of the carrier system occurs over the central rear seat so that lateral access to any supplementary interior equipment on the carrier system is ensured. The carrier system is preferably L-shaped, so that it optimally encloses the seat contour down to the tunnel running in the floor section of the motor vehicle and rests on the tunnel, because the electrical/electronic supply of the motor vehicle accessories is accommodated here, whereby the carrier system exhibits two regions analogous to the two legs of an L, which are connected together. Here, the two regions can be connected together permanently or releasably. The carrier system is fitted such that first the rear attachment device is connected to the adapter arranged on the motor vehicle, whereby the adapter first allows a swivel movement of the carrier system and a connection secure in a crash is only created on reaching the end position. After swivelling the carrier system and on reaching the end position, the carrier system with the lower attachment device is located on the tunnel system. The lower attachment device can be designed variably here. Preferably the lower attachment device is formed as part of a multi-part mounting system, one part of which can be connected to the carrier system according to the invention and the other part to the tunnel system of the motor vehicle. In this manner the carrier system can be easily mounted manually. To prevent unauthorised release of the carrier system, security devices are integrated which especially prevent removal during the journey when the supplementary interior equipment is installed. Since the carrier system in practice is suspended over the seat upholstery, a gap arises between the seat upholstery and the carrier frame. To prevent this gap forming between the seat surface and the carrying parts of the carrier system, i.e. the carrier frame, the cover of the carrier system is formed such that any gap is covered. Practically no wear means in the scope of this invention that wear due to the cover contacting the seat surface may occur over a long time period, but this is so minimal that it can be neglected.

This solution thus offers the advantage that due to the suspended arrangement of the carrier system, practically no wear occurs. Furthermore, due to the formation of the rear and lower attachment devices, the carrier system can be easily fitted and removed by the user. The supplementary interior equipment can be fitted and removed by the user without a lot of effort.

An advantageous embodiment of the invention provides that the carrier system is arranged over the central seat surface. Then, due to the L-shaped form of the carrier system, it can be arranged suspended over the central rear seat in a space-saving manner, without a user having to take out the central rear seat before fitting it. In this way, the carrier system according to the invention offers a clear advantage in convenience and the user does not need to be concerned about where the removable seat is to be accommodated.

However, in some cases it may be of advantage, for example, if an extremely high-structure or high-volume supplementary interior equipment is to be installed, to remove the central seat in order to obtain more space for the accommodation of the supplementary interior equipment. For this reason it is advantageous if the carrier system can be arranged in place of the central seat. Also for supplementary interior equipment to be installed permanently or at least over a longer period of time, for which the central rear seat can be omitted, the arrangement of the carrier system instead of the central rear seat clearly offers advantages of convenience due to the additional space obtained.

A further gain in convenience is achieved in that the carrier system exhibits an electrical/electronic interface for the connection of supplementary interior equipment to the on-board electrical supply and/or on-board electronics of the motor vehicle. In this way additional electrically operated and/or electronic supplementary interior equipment can be installed without a mobile power supply which provides the power supply for only a limited time period. Consequently, notebooks, DVD players or other electrical appliances can be conveniently installed at the back of the motor vehicle. Although motor vehicles offer supplementary power supplies in the back of a motor vehicle, usually they are in the form of 12 V connections which are formed similar to cigarette lighters and positioned at ergonomically unfavourable positions or the overall appearance of the vehicle interior is negatively affected.

The carrier system according to the invention also offers the advantage that the electrical/electronic interface exhibits an upper and a lower connection area, whereby the upper area is formed for the electrical/electronic connection of the interface with supplementary interior equipment and the lower area is formed for the electrical/electronic connection to the on-board electrical supply/on-board electronics near the floor. The electrical supply can in this way be arranged in an ergonomically unfavourable position, but which does not negatively affect the visual appearance of the interior of the motor vehicle, because with the carrier system an electrical/electronic interface is provided which is arranged in an ergonomically favourable position for the user. Here, the carrier system preferably exhibits a device with which the carrier system realises a mechanical connection as well as an electrical/electronic connection to the motor vehicle with one simple grasping movement of the hand. A connection from the lower connection area to the upper connection area is realised by means of a cable system within the carrier system. The supplementary interior equipment can therefore be connected directly in the upper connection area to the carrier system without cables lying loose in the interior of the motor vehicle. It must also be mentioned that the upper cover of the carrier system ensures that the electrical/electronic interface also does not visually impair the overall impression of the vehicle interior.

Due to the limited space available for the carrier system, the carrier system is optimally adapted to the conditions in the interior of the motor vehicle. An L-shaped form has arisen as the optimal form of the carrier system. Preferably the L-shaped carrier system is arranged as a lying "L" in the motor vehicle so that the shorter part of the carrier system essentially points in the direction of the vehicle floor and the longer part of the carrier system is aligned essentially parallel to the seat surface of the rear seats. It is also conceivable that both parts of the carrier system are equally long or also that they exhibit any other size relationship to one another. However, the above described size relationship has been found to be optimal, because the carrier system makes the best possible use of the vehicle interior.

Preferably, the upper cover of a carrier system according to the invention exhibits an edge region and an inner region, whereby at least the edge region is formed as a support surface in which the upper attachment device is formed for the mechanical attachment of supplementary interior equipment to the carrier system. Since the carrier system is formed such that it is suitable for various types of supplementary interior equipment, then, apart from an upper attachment device, a support surface compatible with, where possible, any type of supplementary interior equipment is necessary. This requirement is fulfilled by a support surface with a number of regions, in particular with an inner region and an edge region, whereby the regions can be arranged on levels of different heights so that a number of possible supports can be realised. In order to realise as large a support area as possible, which provides sufficient space for designing the surface, for example on different levels and which due to the large support area permits a low mechanical load on the support area, it is advantageous to accommodate the upper attachment device, which is arranged in the support surface, on the longer part of the carrier system.

In particular there is an advantage in that the upper attachment device is arranged on a surface of the long part of the carrier system, which is essentially aligned in the direction of the vehicle roof. This arrangement provides an easily accessible support surface with an integrated upper attachment device, so that easy fitting of supplementary interior equipment is possible.

Accordingly, there is an advantage in that the lower attachment device is arranged in a region of the shorter part of the carrier system, which is essentially arranged adjacent to the vehicle floor. Due to the lower attachment device which is essentially arranged as an extension of the upper attachment device, an optimum transfer of the force due to the weight of a supplementary interior equipment is provided, the said force being transferred via the upper attachment device, the carrier system and the lower attachment device into the floor area of the motor vehicle. In this way a mechanically heavy duty carrier system is realised.

On account of the arrangement of the upper and the lower attachment devices, the arrangement of the rear attachment device is a matter of course. In order to attach the system firmly, it is advantageous if the rear attachment device is arranged in a region of the longer part of the carrier system, which is essentially adjacent to the backrest of the rear seats.

It is also advantageous if the upper attachment device is formed as at least one recess in the support surface for the guided retention of the supplementary interior equipment in order to accommodate connecting units on the supplementary interior equipment corresponding to the recess. The recesses do not need to be formed all the same. The recesses can be formed differently in order to eliminate any risk of erroneous installation. The formation of the upper attachment device as a recess is therefore especially suitable, because in this way the type of connecting unit can be varied within certain limits to achieve the optimum connection. Due to the formation of the upper attachment device of the carrier system as a recess, the carrier system, which can also be fitted in the motor vehicle without mounted supplementary equipment, exhibits no dangerous protrusions, which, for example, in the case of a crash or collision could lead to substantial injuries.

A special advantage is if the recess on the support surface is formed as a slot, which is formed wider in a first section and is formed narrower in a second section, in order to accommodate a supplementary interior equipment by means of vertical placement and horizontal movement. Due to this formation of the slots with a number of sections the type of installation can be specified whereby security against erroneous installation is provided. In addition, the special shape of the slots prevents unsuitable supplementary equipment for a vehicle type from being installed due to the incompatible connecting devices. Through the implementation of the recess as a slot also a combined fitting of vertical and horizontal movements is necessary, whereby the combination of supplementary interior equipment and carrier system is provided with additional connection retention and unwanted removal can also be prevented.

A further advantageous embodiment of the invention provides for the upper attachment device exhibiting at least one, preferably two and especially preferably four recesses for the accommodation of a supplementary interior equipment. With an increase in the number of attachment devices the security is also increased to a certain level, or as the case may be the reliability of the connection. If during a crash one of the number of upper attachment devices fails, its function can be compensated by the remaining functioning upper attachment devices. In addition, with a higher number of upper attachment devices the positioning and alignment of the supplementary interior equipment can be carried out more easily.

A further embodiment of the invention provides for the inner region of the support surface being formed as an indentation, which exhibits a raised interface region in which an electrical/electronic interface for the electrical and/or electronic connection of the supplementary interior equipment to the on-board electrical supply and/or to the on-board electronics is formed. Due to the arrangement of the interface in the inner region, protection is provided for the usually sensitive electrical/electronic connection between the supplementary equipment and the carrier system. With the supplementary equipment fitted the interface is completely enclosed by the carrier system and the supplementary interior equipment, whereby the susceptibility to failure and any damage to the interface is avoided and also faults and damage through the interface are avoided. The interface here is formed such that a connection of the carrier system and supplementary equipment can only occur with an installation carried out according to instruction. Consequently, the arrangement of the interface also offers an additional safety function. The arrangement of the interface within a recessed inner region also offers the advantage that the carrier system does not take up so much room and the interface is better protected, particularly with the supplementary equipment not fitted.

It is also advantageous if the shoulder defined by the recessed inner region and the raised edge region and/or the raised interface region can interact with a suitable latching device on the supplementary interior equipment and therefore act as a security unit or security device against unauthorised removal of the supplementary interior equipment from the carrier system. In this way the shoulder thus formed can be excellently used for another security device arranged on the supplementary equipment in that the security device of the supplementary equipment and the shoulder interact. In this way the combination of carrier system and supplementary equipment is connected more securely and more reliably.

An advantageous development of the carrier system provides that the lower attachment device can be placed on the floor region of a motor vehicle in the foot space of the motor vehicle and can be connected to it through a lever mechanism so that a mechanical connection and/or a connection to the on-board electrical supply and/or on-board electronics occurs. In addition, an advantage is particularly obtained in that the floor region of a motor vehicle, on which the lower attachment device can be placed, is a tunnel system of a motor vehicle. The lower attachment device can here be formed in one part as a permanent constituent part of the carrier system or it can be formed in many parts as the lower attachment device which can be connected to the carrier system and the tunnel system. Here, the lower attachment device is preferably formed such that a mechanical connection and also electrical/electronic contacts of the carrier system to the tunnel electrical/electronic systems occur with a lever actuation. With this type of lower attachment device simple handling of the carrier system is possible, in particular easy fitting with few grasps of the hand by the user.

A special advantage is that the lower attachment device exhibits a security device which prevents unauthorised release of the carrier system. Preferably, the actuation of the security device is formed such that an unintentional actuation is eliminated. The security device here prevents in particular release of the carrier system with the connected supplementary interior equipment. The security device can exhibit an indicator which gives information about the status of the latch. This indicator can, for example, also be displayed via the on-board electronics on instrument dashboards within the vehicle. It is also conceivable that this security device is actuated, i.e. latchable or delatchable, by means of the on-board electronics.

Furthermore, it is advantageous if the security device is formed as a spring element with a protrusion formed as a block. This embodiment enables a highly efficient but simply constructed security device to be formed in the smallest space in the front cladding. Also, two or more security devices can be formed whereby additional security against unauthorised or unintentional release is ensured. The security devices can in each case be formed differently. For example, a combination of a spring element and any other implementation is quite conceivable.

In addition an advantage is achieved in that the rear attachment device can be connected by means of a hook device similar to a latch mechanism with bolts located on the side of the central rear seat. In this manner an easily implemented attachment can be achieved, which is easy to be fitted and with which the attachment occurs in a region not visible to the passenger. The attachment device here protrudes into the seat crevice or in the partition region of the rear seats, so that no interfering components of the attachment device protrude into the rear-seat space.

An advantageous embodiment of the invention provides that the rear attachment device exhibits at least two supporting surfaces for the connection with two retention devices, whereby the rear attachment device is formed such that with a horizontal position of the carrier system the rear attachment device is connected to the motor vehicle and that with a sloping position of the carrier system to the seat surface, the carrier system can be released.

Preferably, the carrier system is formed such that the rear attachment device is connected to the carrier frame. In this way a strong connection can be realised. The energy, released for example during a collision, is optimally deviated by the strongest components of the carrier system.

Furthermore, it is advantageous if the rear attachment device is connected by means of an adapter which is connected to the motor vehicle. Bolts for attaching the rear attachment device are not present in every motor vehicle at the side of the central seat in the rear. However, in order to be able to use the carrier system in motor vehicles already available on the market, it is advantageous if the rear attachment device can be connected to the motor vehicle by means of an easily retrofitted adapter.

Here, it is advantageous if the adapter is formed with the rear attachment device according to a type of lock system. In this manner it can be ensured that a secure and reliable attachment is realised.

Preferably, the adapter exhibits at least one profile frame, at least one lug and at least one connection piece for connecting the adapter to the motor vehicle, in particular to the body of the motor vehicle. The profile frame provides the necessary strength with this construction. A secure connection between the adapter and the motor vehicle is realised by means of the connection piece. Finally, the lug is used for a secure and reliable connection of the rear attachment device to the adapter. With this method a simple, easily manufactured structure can be obtained, which meets however the strict requirements of the (German) Technical Control Board (TÜV) or other institutions responsible for the safety of motor vehicles and accessories as well as standards, guidelines and directives.

The connection piece is advantageously releasably connected by a screw connection to the motor vehicle. This means the adapter can be interchanged as required and can be easily replaced in the case of wear, for example, after a slight crash. In addition it is advantageous if alternatively the connection piece can be unreleasably connected by means of, for example, a formed connection to the motor vehicle. In this way a permanent connection of the adapter can be realised which is designed for long-term use with appropriate rating of the adapter components.

In a special embodiment this unreleasable connection is formed such that the connection piece is welded unreleasably to the motor vehicle. Through this connection, forces acting on the carrier system can be transferred without any problem to the motor vehicle, whereby the connection can be established reliably and easily.

With one embodiment according to the invention the rear attachment device is formed such that with the carrier system fitted it protrudes into the gap formed between a lower region of the upholstery of a backrest and a rear region of upholstery of a corresponding seat. Consequently, apart from an improved visual appearance, it is also ensured that any metal parts, which for example could lead to additional injuries of the vehicle occupants in the case of a crash are separated from the interior by the upholstery, providing improved occupant protection.

Another embodiment provides for the carrier frame to exhibit an energy absorption device which is integrated into the carrier frame and which comprises a profile panel with a deformable region, whereby the rear attachment device is arranged on the energy absorption device. Since the carrier frame of the carrier system has restrictions on its size due to the limited installation space available and that it consequently cannot deviate all the arising amounts of energy without failing, it is one of the improving measures of the invention, that an additional energy absorption frame is integrated into the carrier system, and in a favourable way in the carrier frame. The energy absorption device is here formed such that when an amount of energy acting on the carrier system exceeds a certain amount, the amount of energy is absorbed by plastic deformation.

It is advantageous if the deformable region of the energy absorption device exhibits a slot with a recess, which exhibits a larger width than the slot, at the end of the slot, whereby the recess is formed for accommodating a bolt. The direction in which the energy absorption is to take effect can be predetermined by the slot. In this way the energy is specifically deviated, without, for example, unplanned splintering arising, which would represent an additional potential hazard for the motor vehicle occupants.

Another advantage is obtained in that the energy absorption device is connected to the carrier frame by means of a bolt joint, whereby the bolt is arranged in the larger recess of the slot such that in a crash the bolt widens the slot and deforms it, thus absorbing the energy of the crash. This arrangement offers the advantage that this energy absorption device can be realised simply and can be easily fitted to the carrier frame.

A further embodiment of the invention provides for the electrical/electronic interface to exhibit electrical cables for the connection of the electrical interface to the on-board electronics and/or the on-board electrical supply. In this way the interface can be arranged at any position on the carrier system without needing to be located near the tunnel which surrounds the on-board electrical supply/on-board electronics. In this way electrical/electronic connections can be arranged ergonomically for the passenger on the carrier system in the interior.

In addition an advantageous embodiment of the invention provides for at least one cover which meets the seat surface, backrest and tunnel of the motor vehicle. Since the carrier system is arranged suspended over the central rear seat, a visually unattractive gap would form between the carrier system and the upholstery without a cover according to the invention. Undesired parts might penetrate the upholstery through this gap, leading to malfunctions. In addition passengers might, for example, jam their fingers in this gap. Therefore, the covers offer an advantageous protection.

A second object is to provide a method which enables the user of a motor vehicle to connect a carrier system according to the invention to a motor vehicle in a simple manner and with few grasps of the hand and without special tools.

The invention includes the technical art in that the method for the attachment of a carrier system, secure in a crash, to a motor vehicle and connecting the carrier system to an existing electrical/electronic system comprises the following steps: positioning a rear attachment device and connecting it to an adapter and actuation of a lower actuation device for connection to a connection part, in particular to a motor vehicle, preferably to a tunnel system of a motor vehicle.

In this respect, it is advantageous if the user can simply and quickly fit a carrier system according to the invention without the use of special tools by simple placement of the carrier system and actuation of an actuating device.

It is also advantageous if the positioning of a rear attachment device and the connection to an adapter include the following steps: placement of the rear attachment device at an angled orientation to an essentially horizontal plane, formed by a seat surface of a rear seat, on a first attachment unit of an adapter, movement of the rear attachment device over the first attachment unit up to a first stop and swivelling of the rear attachment device in an essentially horizontal orientation up to a second stop. Due to the two stops, the user can reduce the forces to be applied in that he can place the carrier system onto the attachment unit and can push the carrier system along this attachment unit, and also in that simple operation without difficult positioning can occur due to the stops.

In addition, it is advantageous if the actuation of an actuating device for the attachment of a lower attachment device includes the steps: mechanical connection and electrical/electronic connection to a tunnel system of a motor vehicle, whereby the mechanical and the electrical/electronic connections are realised with a single actuation process. In this way the user does not have to assume any difficult constrained position for the secure and reliable installation of the carrier system, but rather he can simultaneously establish an electrical/electronic connection and a mechanical connection comfortably and ergonomically with one grasp of the hand.

BRIEF DESCRIPTION OF THE DRAWINGS

Further measures improving the inventions are given in the sub-claims and are illustrated in detail in the following together with the description of a number of preferred embodiments of the invention based on the figures. The following are shown:

DETAILED DESCRIPTION OF THE PREFERRED EMBODIMENTS

Figure 1:
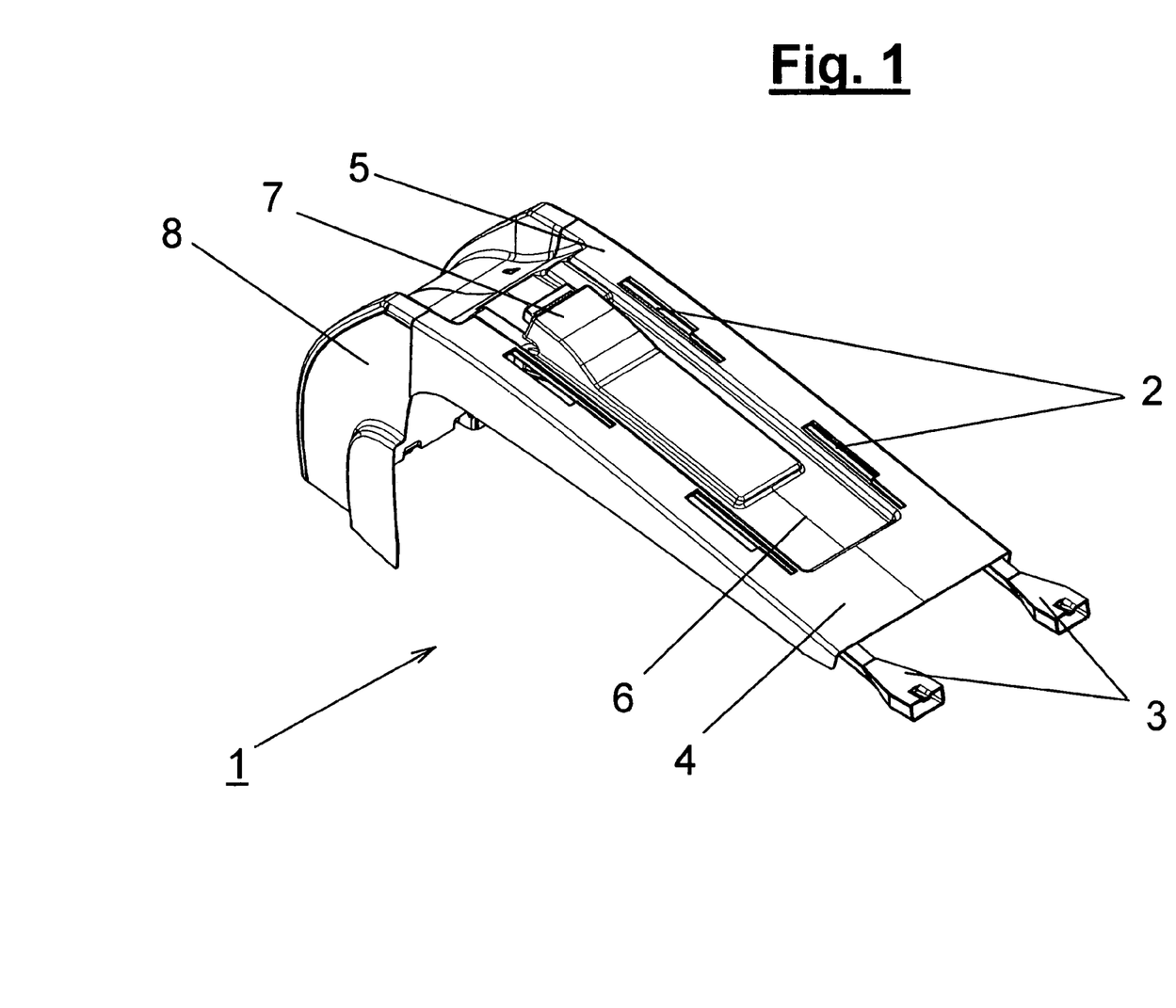
FIG. 1 a perspective view of a carrier system according to the invention.

FIG. 1 shows in a perspective view a carrier system 1 according to the invention, which comprises three attachment devices, i.e. an upper attachment device 2 for the attachment of a supplementary interior equipment and two attachment devices, i.e. a lower (not shown here) and a rear attachment device 3, for the attachment of the carrier system 1 to a basic model, in this case for attachment to a motor vehicle. The carrier system 1 exhibits four upper attachment devices 2 which are formed as slots in the upper support surface 4 of the upper cover 5, so that a supplementary interior equipment with appropriately formed, corresponding attachment devices, which can engage in the slots, can interact with them. Here, the slots exhibit a wider and a narrower region. The wider region is essentially used for the vertical placement of the supplementary interior equipment, which then, due to an essentially vertical movement along the support surface 4, is connected to the carrier system 1. The support surface 4 exhibits a recessed inner region 6, which together with an electrical/electronic interface 7 arranged raised in the inner region 6 and the support surface 4 forms a shoulder, which interacts with a latching device of the supplementary interior equipment. The electrical/electronic—abbreviated here to electr.—interface 7 of the essentially L-shaped carrier system 1 is used for the electr. supply of the supplementary interior equipment. Furthermore, the carrier system 1 exhibits according to FIG. 1 a front cover 8, which also borders the carrier system 1 against the surroundings and thus offers protection and together with the upper cover, determines the visual appearance of the overall carrier system 1. The rear attachment device 3 comprises two devices, which in the fitted state protrude into the seat crevice of the motor vehicle and which interact together with at least one adapter arranged on the motor vehicle (not shown here) and realise a mechanical connection. The connection here is so reliable that the carrier system 1 withstands a motor vehicle crash according to the applicable regulations.

Figure 2:
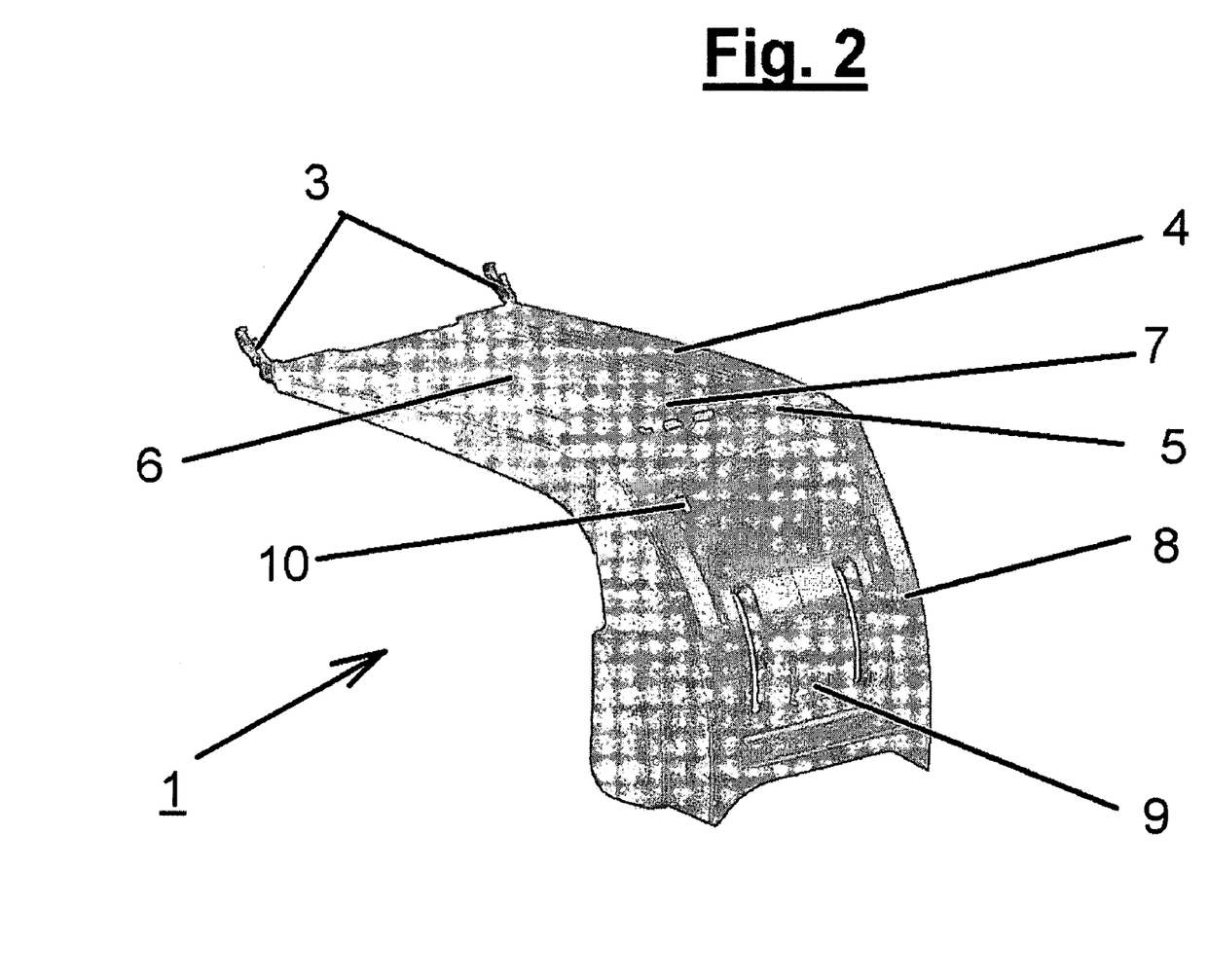
FIG. 2 a perspective view of a second carrier system according to the invention.

FIG. 2 shows another variant of a carrier system 1 according to the invention in another perspective view, whereby the variant illustrated in FIG. 2 differs only through the differently formed rear attachment device 3. The front cover 8 exhibits two slot-shaped recesses, which are used for guiding an operating element (not shown) arranged in the recesses. This operating element is secured against unauthorised release of the carrier system 1 by a security device 9, which comprises a spring element with a raised part formed as a dog. In addition the security device comprises an element which can be passed through the opening 10, thus permitting opening only with the supplementary interior equipment removed.

Figure 3:
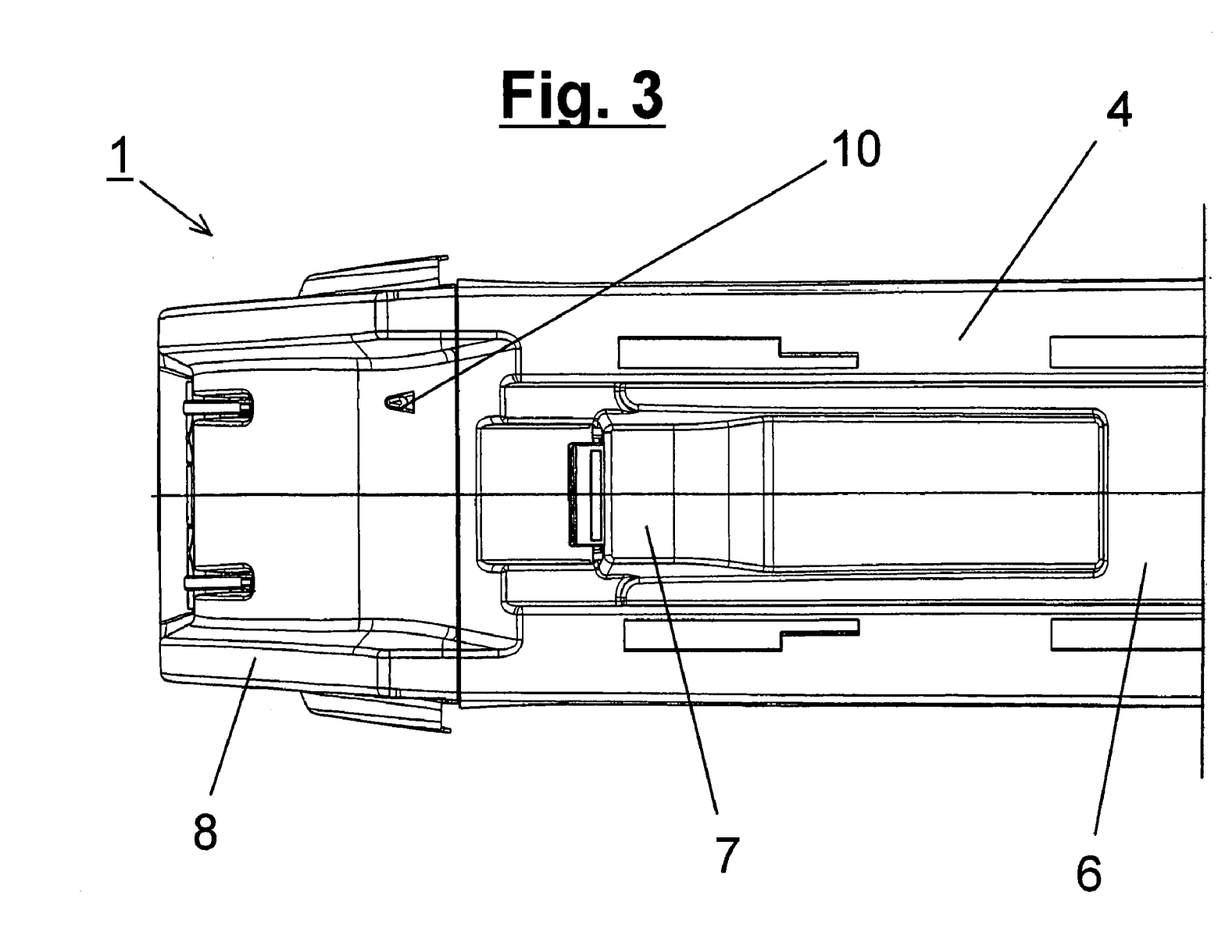
FIG. 3 an extract of a plan view on a carrier system according to the invention.

FIG. 3 illustrates an extract of a plan view on a carrier system 1 according to the invention. Here, the two covers 5, 8 can be recognised. In particular, the opening 10 for guiding a securing device can be seen which is formed in the front cover 8, which is illustrated to the left in the view. The upper cover 5 illustrated in the right section of the illustration exhibits according to the invention a support surface 4, in which an upper attachment device 2 is formed in the shape of four slots which exhibit a wider and a narrower part. The support surface 4 encloses a recessed inner region 6, which exhibits an electr. interface 7. The covers 5, 8 illustrated in FIG. 3 are preferably produced in plastic.

Figure 4:
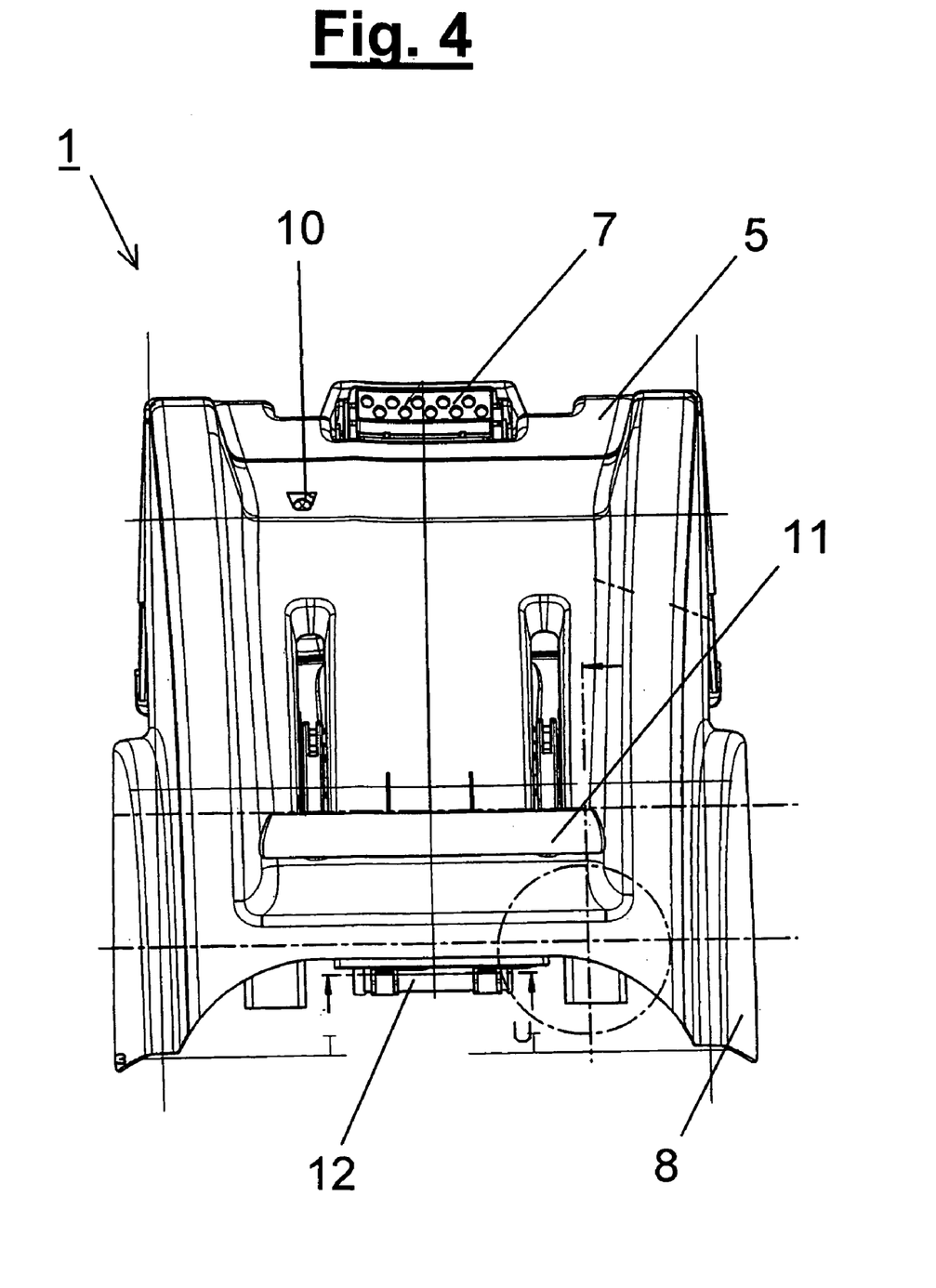
FIG. 4 a front elevation of a carrier system according to the invention.

In FIG. 4 the carrier system 1 illustrated in FIG. 3 is shown in front elevation. The electr. interface 7, formed raised, which exhibits a plug for the connection of a supplementary interior equipment fitted with a corresponding plug, can be clearly seen in the upper cover 5. In the upper region of the front cover 8 the opening 10 for the guidance of a security device (not shown) can be seen. Furthermore in the front cover 8 two guides for the accommodation of an actuating element are formed. It is shown roughly that this actuating element is formed as a lever 11. The lower attachment device 12 can be actuated by means of the lever 11. This attachment device 12 also provides a mechanical connection to the motor vehicle and a mechanical connection to the on-board electrical supply/on-board electronics.

Figure 5:
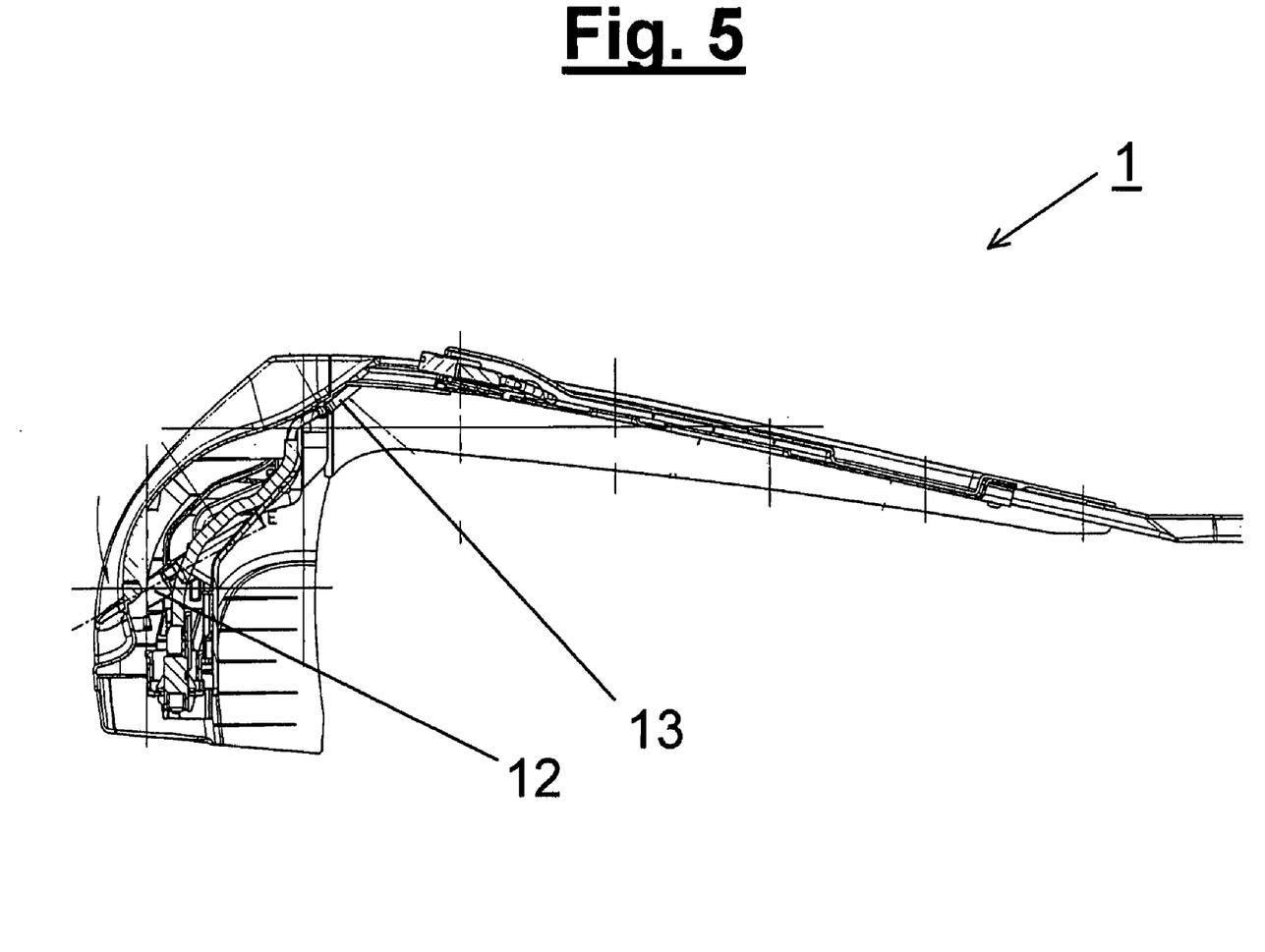
FIG. 5 a longitudinal section of a carrier system according to the invention in a side elevation.

FIG. 5 shows a longitudinal section through a carrier system 1 according to the invention in side elevation. In this view the arrangement of the cable assembly 13 of the carrier system for the electr. supply and the mechanical details of the lower attachment device 12 are illustrated. One can clearly see that the arrangement is designed to optimise the space and therefore little installation volume is required, so that a compact carrier system 1 can be realised.

Figure 6:
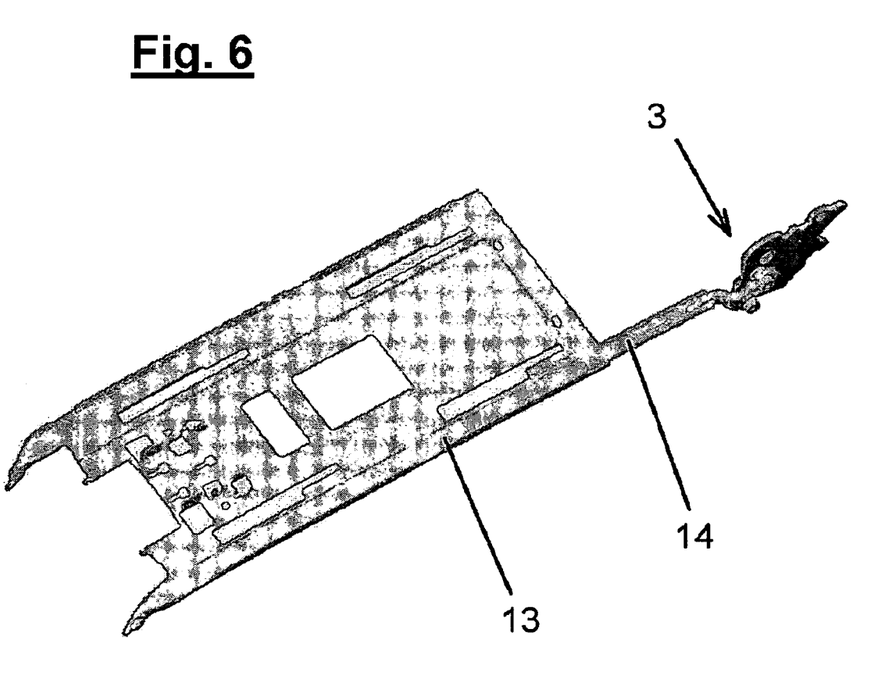
FIG. 6 a perspective view of a carrier frame with energy absorption device and rear attachment device.
Figure 7:
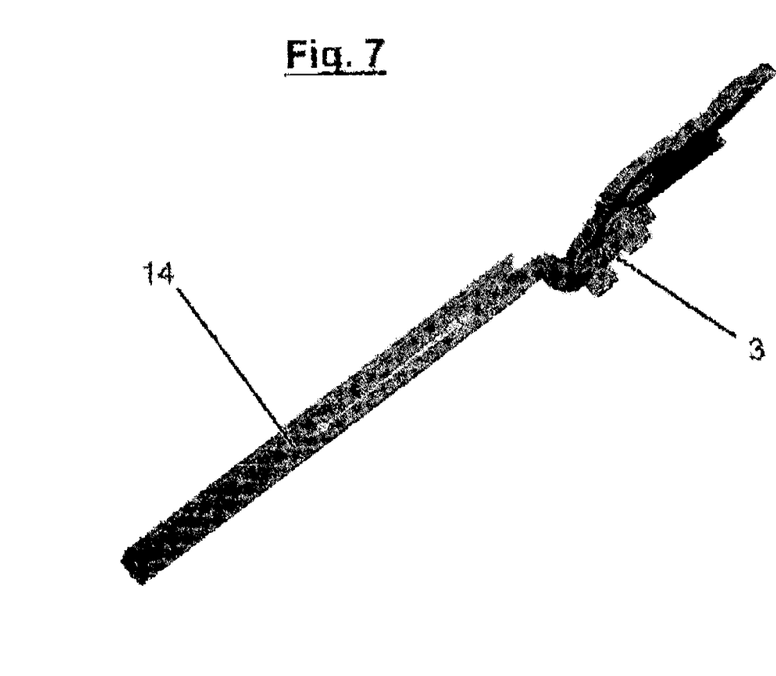
FIG. 7 a perspective view of an energy absorption device of a carrier system according to the invention.

FIG. 6 shows in perspective representation a carrier frame 13 which is connected to an energy absorption device 14 on which a rear attachment device 3 is arranged. The energy absorption device 14, which is illustrated larger in FIG. 7, is connected to the carrier frame 13 by means of a bolted joint which penetrates the end region of the slot of the energy absorption device 14. With the transfer of an adequate amount of energy, the carrier frame 13 moves with respect to the energy absorption device 14 and deforms it plastically, whereby energy is absorbed.

FIG. 7 shows the energy absorption device 14 more clearly. The energy absorption device 14 according to FIG. 7 is formed as a U-shaped profile panel, which exhibits a slot, which at both ends exhibits a round opening which is formed for the accommodation of a bolt or a similar body. On one end of the profile panel a rear attachment device 3 is arranged and is unreleasably connected to the profile panel. This arrangement is connected to the carrier frame (not illustrated here) and thus forms a part of the carrier system.

Figure 8:
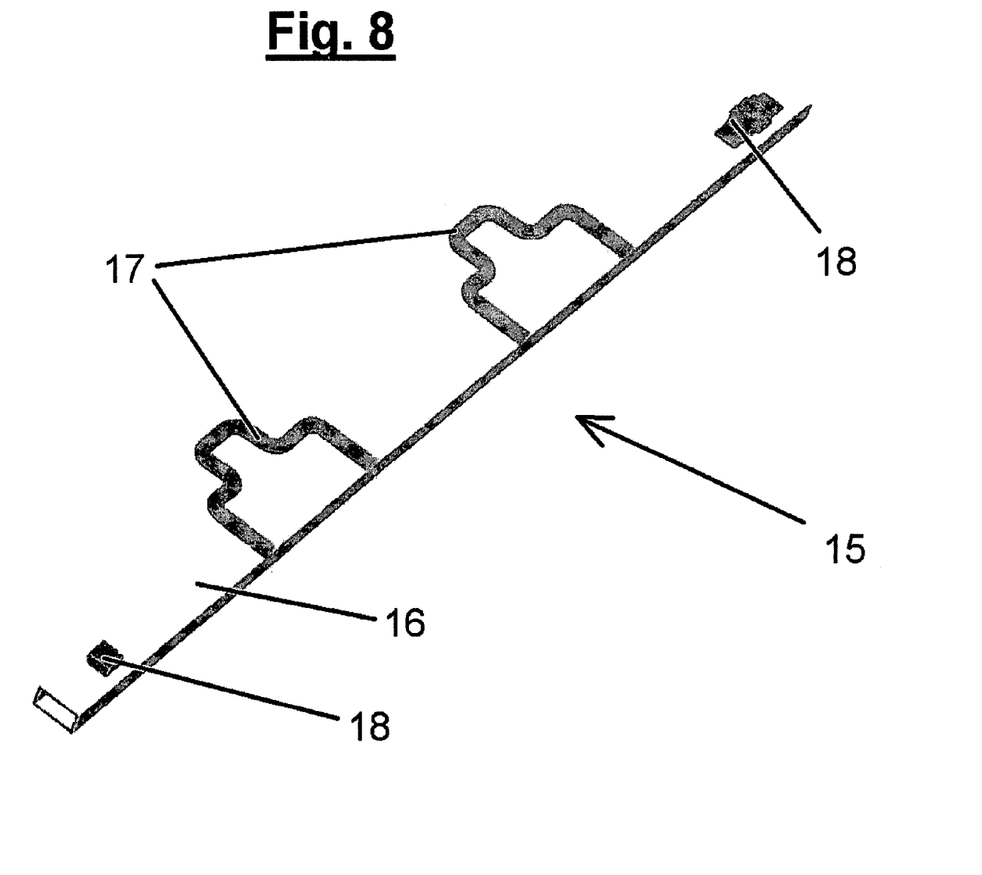
FIG. 8 a perspective view of an adapter of a carrier system according to the invention.

FIG. 8 shows in a perspective illustration an adapter 15 which belongs to a carrier system according to the invention. The adapter 15 consists of a profile frame 16, formed as a square profile tube, on which two lugs 17 for connection to a rear attachment device are arranged. In addition the profile tube exhibits two connection pieces 18 for the mechanical connection of the adapter 15 to the motor vehicle. A releasable connection of an adapter 15 to the motor vehicle is shown in FIG. 9.

Figure 9:
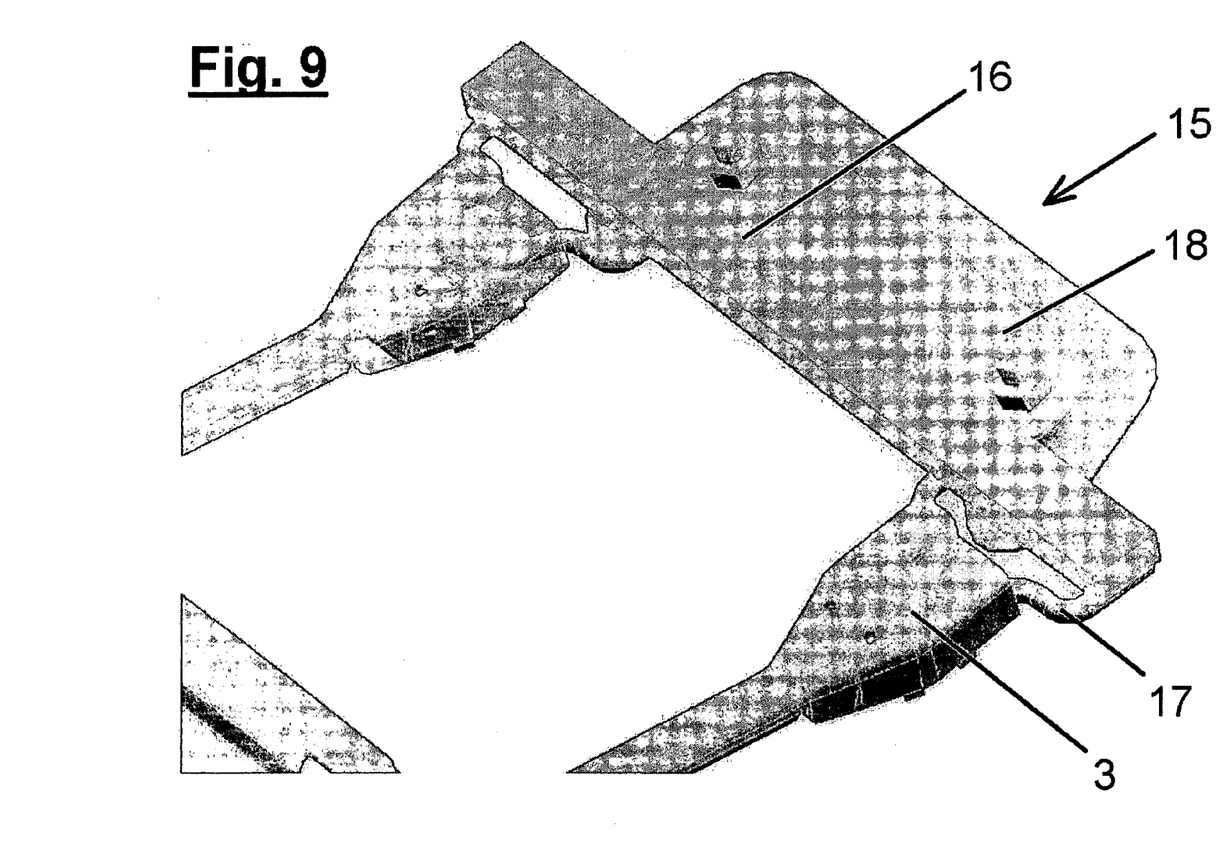
FIG. 9 an extract in perspective view of a carrier system according to the invention, and FIG. 10 the installation of the rear attachment of the carrier system on an adapter in side elevation.

In FIG. 9 an extract of a carrier system is shown in a perspective illustration. The extract includes a rear attachment device 3 and an adapter 15, which are connected together. The adapter 15 comprises a profile frame 16 formed as a square tube, two lugs 17, which are arranged on the square tube and a connection piece 18, which is formed as a panel which is arranged on the square tube and two openings, each for a screw joint with the body of the motor vehicle.

Figure 10:
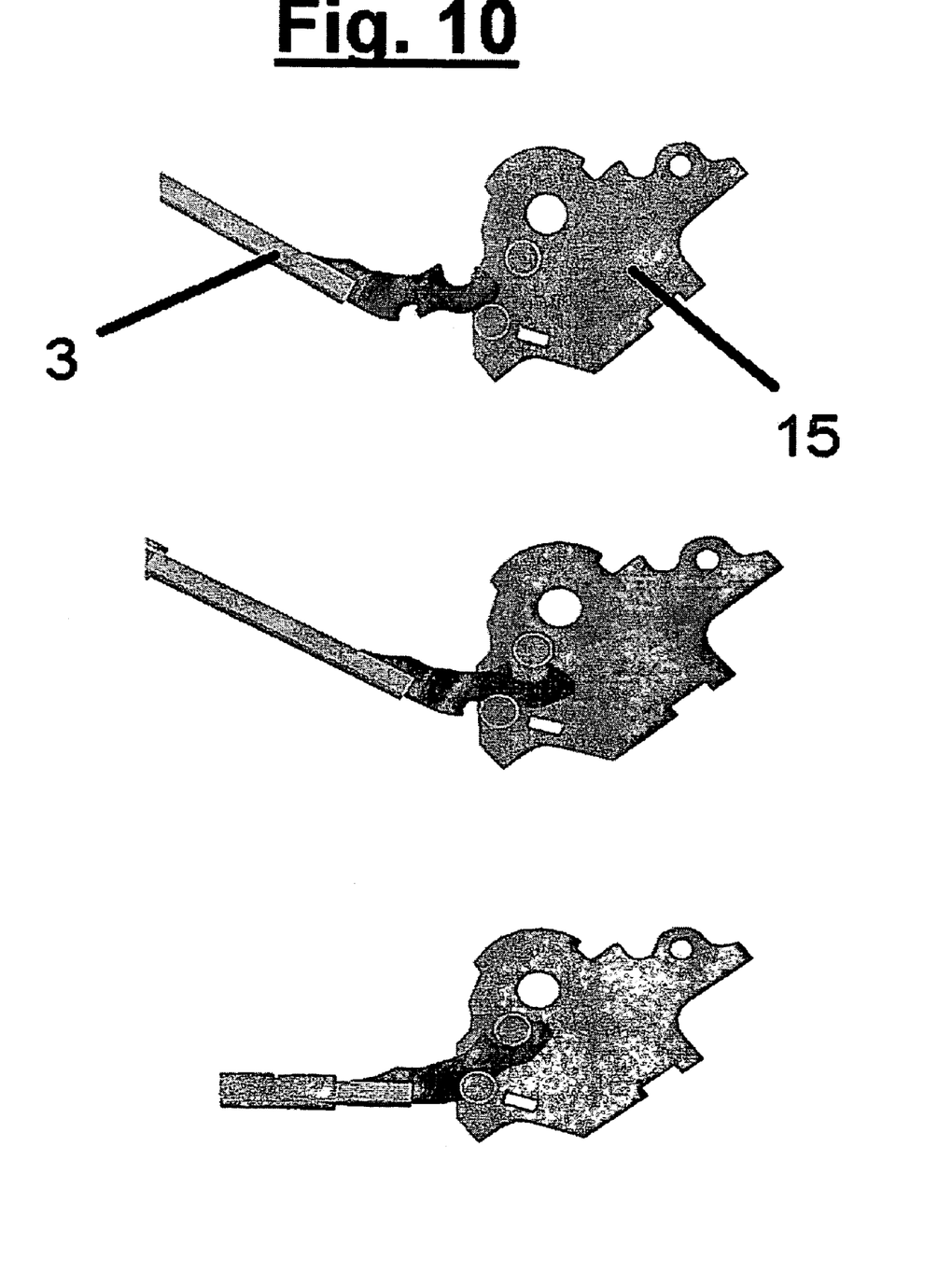

In FIG. 10 the mounting of the rear attachment 3 of the carrier system is shown in three steps, whereby each step is illustrated in a sub-figure. The top first sub-figure shows the attachment device 3 in the unmounted position. The attachment device 3 is placed at an angle to the seat surface on a first, the lower of two bolts of an adapter 15 which is connected to the motor vehicle or to the seat. In a second step, illustrated in the central second sub-figure, the rear attachment device 3 is pushed into practically the same position as in the first sub-figure over the first lower bolt between the first and the second bolt until the rear attachment device 3 butts up, with a specially formed stop, on the first lower bolt. Finally, as illustrated in the bottom third sub-figure, the rear attachment device 3 is swivelled about the first, lower bolt and swivelled from the angled position into an end position which is essentially parallel to the seat surface of a central rear seat. Removal occurs with the steps carried out in the reverse order.

REFERENCE LIST

1. Carrier system
2. Upper attachment device
3. Rear attachment device
4. Support surface
5. Upper region
7. Electrical/Electronic interface
8. Front cover
9. Security device
10. Opening
11. Lever
12. Lower attachment device
13. Carrier frame
14. Energy absorption device
15. Adapter
16. Profile frame
17. Lug
18. Connection piece

What is claimed is:

1. A carrier system (1) for the mechanical connection of an interchangeable supplementary interior equipment, in particular a central console, for use in a motor vehicle, comprising: the carrier system is L-shape and includes a carrier frame (13), an upper attachment device (2), a rear attachment device (3), a lower attachment device (12), means against unauthorized release, the carrier system (1) being releasably connected at least by means of the rear attachment device (3) and by the lower attachment device (12) to the motor vehicle and the supplementary interior equipment is connected by the upper attachment device (2) to the carrier system (1).

2. A carrier system (1) according to claim 1, characterised in that the carrier system (1) is arranged above a central seat surface of the motor vehicle.

3. A carrier system (1) according to claim 1, characterised in that the carrier system includes an electrical/electronic interface (7) for the connection of a supplementary interior equipment to an on-board electrical supply and/or on-board electronics of the motor vehicle.

4. A carrier system (1) according to claim 3, characterised in that the electrical/electronic interface (7) includes an upper connection region and a lower connection region, the upper region being formed for the electrical/electronic connection of the interface (7) to the supplementary interior equipment and the lower region being formed for the electrical/electronic connection near a vehicle floor to the on-board electrical supply/on-board electronics.

5. A carrier system (1) according to claim 1, characterised in that the L-shaped carrier system (1) is arranged as a lying "L" in the motor vehicle such that the shorter part of the carrier system (1) points essentially in the direction of a vehicle floor and the longer part of the carrier system (1) is essentially aligned in parallel to a seat surface.

6. A carrier system (1) according to claim 1, further including an upper cover (5) that protects and defines a border of the carrier system (1), the carrier system (1) including an edge region and an inner region (6), the edge region providing a support surface (4) at which the upper attachment device (2) is located for the mechanical attachment of a supplementary interior equipment to the carrier system (1).

7. A carrier system (1) according to claim 1, characterised in that the upper attachment device (2) is arranged on a surface of a longer part of the carrier system (1), which is essentially aligned in the direction of a roof of the vehicle.

8. A carrier system (1) according to claim 1, characterised in that the lower attachment device (12) is arranged in a region of a shorter part of the carrier system (1), which is arranged essentially adjacent to a floor of the vehicle.

9. A carrier system (1) according to claim 1, characterised in that the rear attachment device (3) is arranged in a region of a longer part of the carrier system (1), which is essentially arranged adjacent to a seat backrest.

10. A carrier system (1) according to claim 1, characterised in that the system includes a support surface (4) and the upper attachment device (2) is formed as at least one recess in the support surface (4) for the guided accommodation of the supplementary interior equipment in order to accommodate connection units of the supplementary interior equipment corresponding to the recess.

11. A carrier system (1) according to claim 1, characterised in that the recess of the support surface (4) is formed as a slot, which is formed in a first region wider and in a second region is formed narrower, in order to accommodate a supplementary interior equipment by means of vertical placement and horizontal movement.

12. A carrier system (1) according to claim 7, characterised in that the upper attachment device (2) includes at least one recess for the accommodation of a supplementary interior equipment.

13. A carrier system (1) according to claim 6, characterised in that the inner region (6) of the upper cover (5) is formed as an indentation, which includes a raised interface region, in which an electrical/electronic interface (7) is arranged for the electrical and/or electronic connection of the supplementary interior equipment to an on-board electrical supply and/or to the on-board electronics.

14. A carrier system (1) according to claim 13, characterised in that a shoulder is defined by the indented inner region (6) and the raised edge region and/or the raised interface region and cooperates with an appropriate latching device on the supplementary interior equipment and acts as a security unit against unauthorized removal of the supplementary interior equipment from the carrier system (1).

15. A carrier system (1) according to claim 1, characterised in that the lower attachment device (3) can be placed on a floor region of a motor vehicle in a foot space of a motor vehicle rear area and can be connected to it by means of a lever mechanism, so that a mechanical connection and/or a connection to an on-board electrical supply and/or on-board electronics takes place.

16. A carrier system (1) according to claim 15, characterised in that the floor region of a motor vehicle, on which the lower attachment device (3) can be placed, is a tunnel system of a motor vehicle.

17. A carrier system (1) according to claim 1, characterised in that the lower attachment device exhibits a security device (9), which prevents unauthorized release of the carrier system (1).

18. A carrier system (1) according to claim 17, characterised in that the security device (9) comprises a spring element, which is formed with a shaped dog as an interlock.

19. A carrier system (1) according to claim 1, characterised in that the rear attachment device (3) can be connected by means of a hook device to bolts located on the side on a central rear seat.

20. A carrier system (1) according to claim 15, characterised in that the rear attachment device (3) includes at least two support surfaces for the connection to two retention devices, whereby the rear attachment device (3) is formed such that with a horizontal position of the carrier system (1) the rear attachment device (3) is connected to a motor vehicle and that with a sloped position of the carrier system (1) to a seat surface, the carrier system (1) can be released.

21. A carrier system (1) according to claim 15, characterised in that the rear attachment device (3) is connected to the carrier frame (13).

22. A carrier system (1) according to claim 15, characterised in that the rear attachment device (3) can be releasably connected by means of an adapter (15) which is connected to the motor vehicle.

23. A carrier system (1) according to claim 22, characterised in that the adapter (15) and the rear attachment device (3) cooperate to provide a catch system.

24. A carrier system (1) according to claim 23, characterised in that the adapter (15) includes at least one profile frame (16), at least one lug (17) and at least one connection piece (18) for the connection of the adapter (15) to the motor vehicle.

25. A carrier system (1) according to claim 24, characterised in that the connection piece (18) can be releasably connected by means of a screw joint to the motor vehicle.

26. A carrier system (1) according to claim 24, characterised in that the connection piece (18) can be unreleasably connected by means of a formed connection to the motor vehicle.

27. A carrier system (1) according to claim 24, characterised in that the connection piece (18) is welded unreleasably to the motor vehicle.

28. A carrier system (1) according to claim 15, characterised in that the rear attachment device (3), with the carrier system (1) fitted, protrudes into a gap formed between a lower region of upholstery of a backrest and a rear region of upholstery of a corresponding seat.

29. A carrier system (1) according to claim 1, characterised in that the carrier frame (13) exhibits an energy absorption device (14) integrated into the carrier frame (13) and comprising a profile frame with a deformable region, whereby the rear attachment device (3) is arranged on the energy absorption device (14).

30. A carrier system (1) according to claim 29, characterised in that the deformable region of the energy absorption device (14), exhibits a slot with a larger recess at the end of the slot, the larger recess being formed for the accommodation of a bolt.

31. A carrier system (1) according to claim 30, characterised in that the energy absorption device (14) is connected to the carrier frame (13) by means of a bolted joint, whereby the bolt is arranged in the larger recess of the slot such that with a crash the bolt widens the slot and deforms it, thus absorbing the energy of the crash.

32. A carrier system (1) according to claim 3, characterised in that the electrical/electronic interface (7) includes electrical cables for the connection of the electrical/electronic interface (7) to the on-board electronics and/or the on-board electrical supply.

33. A carrier system (1) according to claim 1, which includes at least one cover (5, 8) that meets a seat surface, a backrest and a tunnel of the motor vehicle.

* * * * *